Figure 1:
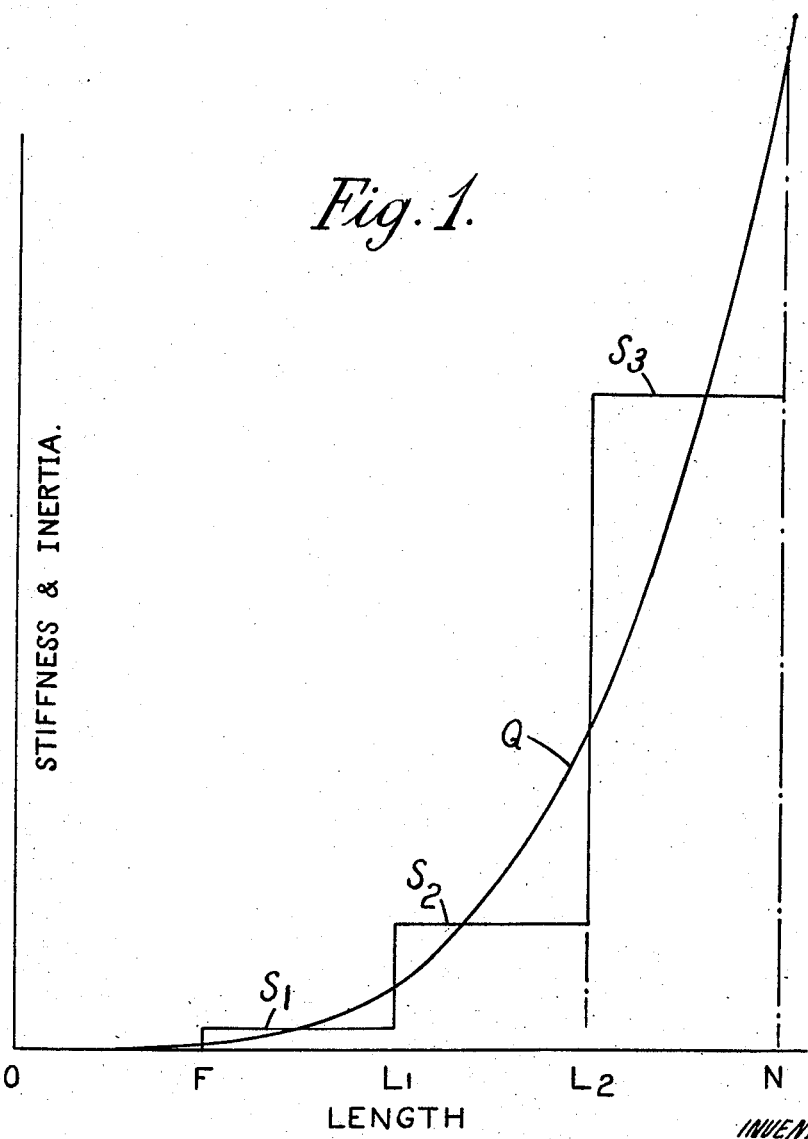

June 17, 1958     A. SYMON ET AL     2,838,950
MECHANICAL AND HYDRAULIC REMOTE CONTROL SYSTEMS
Filed April 6, 1953     3 Sheets-Sheet 3
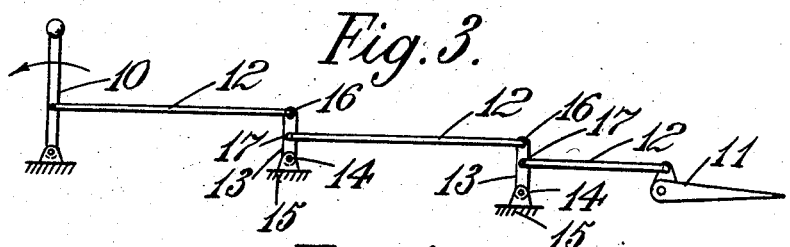
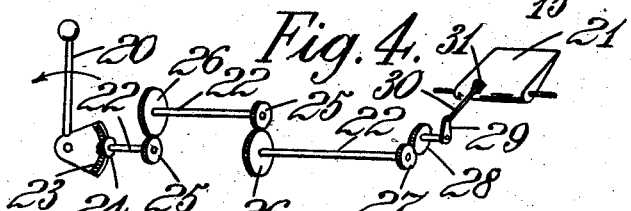
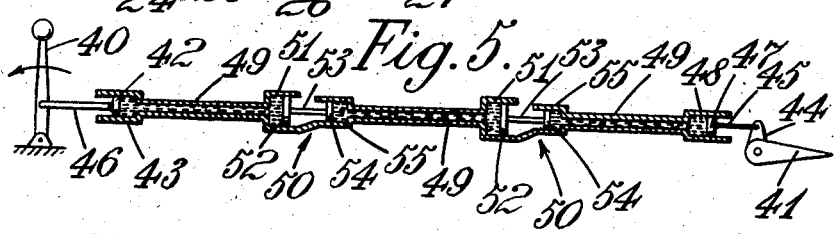
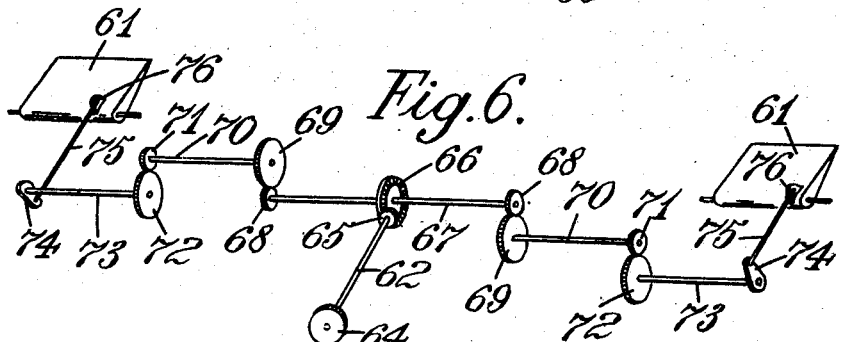
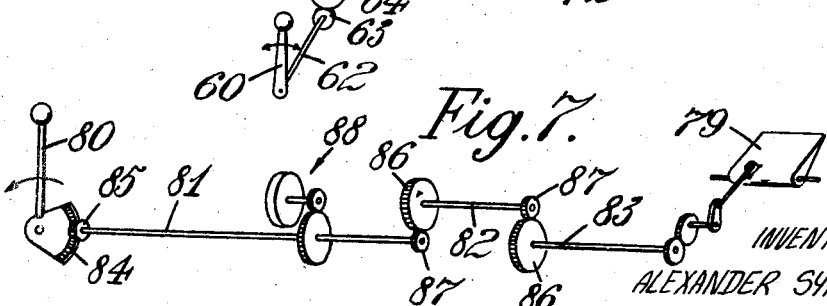
INVENTORS
ALEXANDER SYMON &
NORMAN FREDERICK HARPUR &
CHARLES JOHN EDWIN CARTER
BY Wilkinson & Mawhinney
ATTYS.

2,838,950

MECHANICAL AND HYDRAULIC REMOTE CONTROL SYSTEMS

Alexander Symon, Norman Frederick Harpur, and Charles John Edwin Carter, Bristol, and John Malcolm Williams, Middlesex, England, assignors, by mesne assignments, to Bristol Aircraft Limited, Bristol, England, a British company Application April 6, 1953, Serial No. 347,312
(Filed under Rule 47(a) and 35 U. S. C. 116)

Claims priority, application Great Britain April 7, 1952

17 Claims. (Cl. 74—469)

This invention relates to mechanical and hydraulic remote control systems.

Mechanical and hydraulic remote control systems frequently have to be designed so that their fundamental frequency of vibration differs by a sufficient amount from the frequency of vibration of the controlled device to ensure that instability does not occur. The case of a transmission having a natural frequency of the same order or lower than that of the controlled device is usually undesirable, but the difficulty arises that whereas it is a simple matter to reduce the frequency by the addition of masses or their equivalent, the frequency cannot be raised by uniformly increasing the stiffness of the transmission, as might be supposed, because the increased inertias which go with the increased stiffness offset the gain.

It is known that in elastic systems comprising associated parts having different inertias and stiffnesses the fundamental frequency of the system is dependent upon the ratios of these inertias and stiffnesses, and mathematical methods of calculating the properties of such systems are well known. The object of the present invention is to apply this knowledge to the design of remote control systems so as to produce a system having an increased natural frequency of vibration.

Considering the case of a transmission member the stiffness of which varies along its length, stiffness being defined as the reciprocal of the strain produced in an elementary unit length of the member by unit load applied to one end of the system, study shows that the highest frequency of vibration is obtained when the stiffness varies from the free end to the node in proportion to the fourth power of the distance from the free end. In the case of a torsion shaft, for example, this disposition corresponds to a solid shaft with a straight taper to a point at the free end, all such shafts of the same material and length having the same natural frequency. Such an arrangement is, of course, not practical for a remote control system since on the one hand a certain minimum strength is necessary at the free end and on the other hand the tapered formation is inconvenient and apt to lead to excessive weight.

This invention provides an approximation to such an arrangement and in one aspect the invention provides an elastic remote control system having an end which is substantially free so as to be capable of vibrational movements relative to a node in the system, which node may be at its other end, in which the stiffness of the transmission (as defined above) varies progressively or in steps along the system from the free end to the node approximately in proportion to the fourth power of the distance from a point at or somewhat beyond the free end.

It is in most cases convenient to use load-transmitting members of the same material and section throughout, from which aspect the invention may be defined as consisting in an elastic remote control system comprising a plurality of load-transmitting members which have the same relation between density and stress-strain modulus for the transmission stresses and substantially uniform cross-sectional area or polar moment of inertia (as the case may be) and in which the stiffness of the transmission is varied in steps from a minimum at the free end to a maximum at the node by the inclusion at spaced intervals along the system of means for changing the stress in the load transmitting members as between one load transmitting member and an adjacent load transmitting member.

For the case in which the load is transmitted by tension and/or by compression in solid (i. e. non-fluid) members of the same material and section the invention may be applied by the inclusion at spaced intervals along the system of mechanisms effecting a change of velocity of linear displacement between adjacent members, for example levers having fixed fulcrum bearings and arms of different length to which the adjacent members are jointed.

Remote control systems comprising rotary shafts possess characteristics which make them very convenient for many applications, in particular their maintenance requirements are low and the space occupied small compared with say tensioned cable controls, while compensation for expansion due to temperature change or other causes presents no difficulty. Their principal disadvantage consists in their low torsional vibration frequency, and the present invention enables a substantial improvement to be effected in this respect.

To this end an important application of the invention consists in the provision at spaced intervals along a torque shaft system of toothed gearing effecting a change of rotational speed between adjacent shafts so that the stiffness of the transmission is varied in steps from a minimum at the "free end" to a maximum at the node.

A corresponding application of the invention to a hydraulic remote control system provides a system in which the load is transmitted by liquid pressure in pipes of substantially uniform cross-sectional area and the stiffness of the transmission is varied in steps by the inclusion at spaced intervals along the system of means effecting a change in the velocity of flow of the liquid between adjacent pipes. Such means may comprise for example interconnected pistons of different area subjected to the pressure of the liquid in the adjacent pipes.

In another aspect the invention provides an elastic remote control system comprising an input member, an output member which is substantially free so as to be capable of vibrational movements relative to a node in the system, a plurality of load transmitting sections between said input member and said output member, and connecting means between adjacent load-transmitting sections of a kind which decreases the stiffness of successive sections from said node.

Thus, in one construction, the invention may provide an elastic remote control system comprising a fixed structure, an input member, an output member capable of vibrational movements relative to a node in said system, a plurality of tension-compression members connected between said input member and said output member, and a plurality of levers each having a fulcrum in said fixed structure and each having pivotal connections at adjacent ends of a pair of said tension-compression members, the pivotal connection between each lever and the tension-compression member between said lever and said node being further from the fulcrum of said lever than the pivotal connection between said lever and the other tension-compression member of said pair.

Another construction according to the invention comprises an input member, an output member capable of vibrational movements relative to a node in said system, a plurality of shafts each made of the same material and of the same cross-section arranged to transmit torque from said input member to said output member, and a plurality of speed reducing gears each between a different pair of adjacent shafts arranged so that the shaft nearer the node of each such adjacent pair rotates faster than the shaft further from the node when the input member is adjusted.

Yet another construction of the invention provides an elastic remote control system which comprises an input member, an input cylinder, an input piston in said output cylinder and connected to said input member, an output member capable of vibrational movement relative to a node in said system, an output cylinder, an output piston in said output cylinder and connected to said output member, a plurality of ducts each having the same diameter as the others between said input cylinder and said output cylinder, a plurality of piston and cylinder connections one between each adjacent pair of ducts, each piston-and-cylinder connection comprising a large diameter cylinder connected to the duct of said pair between the connection and the node, a large diameter piston in said large diameter cylinder, a small diameter piston connected to said large diameter piston to move therewith and a small diameter cylinder containing said small diameter piston and connected to the other duct of the pair, and hydraulic liquid charging said ducts and said cylinders.

A further feature of the invention consists in that the stiffness of the transmission as a whole may be increased by providing at the input end stress-decreasing means such as speed-increasing gearing, while at the output end gearing or its equivalent is introduced as necessary to obtain a control movement of the desired magnitude. Such gearing or its equivalent at the input or output end may further be of a type in which the transmission ratio varies continuously through the whole or part of the working range so that a fine control is available at a certain part or parts of the range and a coarser control at another part or parts. For this purpose use may be made for example of so-called elliptical or eccentric gears.

In the simplest form of remote control the "free" end of the system will be at the controlled member, for example the regulating means of a servo device or an aerodynamic control surface, while the node will be at the input end of the system, for example, a continuously restrained manual control lever, but systems are also possible in which the node is at an intermediate point in the system, both the control and controlled members being allowed freedom of movement. In this case according to the invention the stiffness is arranged to increase from both ends towards the node.

Figure 2:
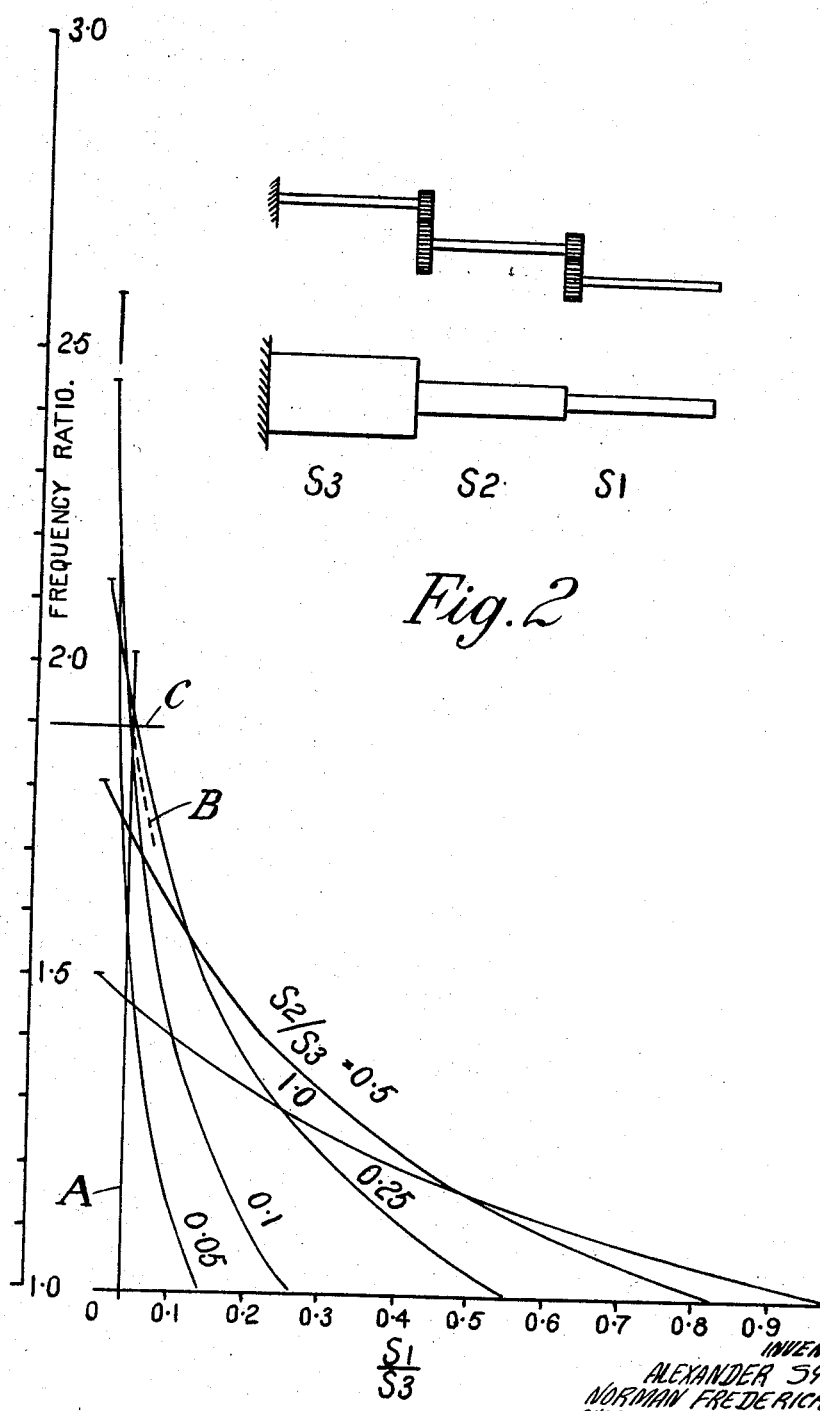

A method of designing an elastic remote control system in accordance with the invention and a number of elastic remote control systems will now be described by way of example with reference to the accompanying drawings in which:

Figures 1 and 2 show graphs employed in the method of designing and

Figures 3 to 7 each show an elastic remote control system in accordance with the invention.

In designing a remote control system an important consideration is the total inertia of the moving parts, since this determines how stiff the system can be made against deflection under working loads. Having decided upon an acceptable value, a suitable quartic curve can be drawn showing the approximate optimum distribution of inertia (and stiffness) along the transmission, the area below the curve corresponding to the total inertia. Such a curve is represented by the line Q in Figure 1 of the accompanying drawings, in which abscissae denote lengths from the origin O while ordinates represent inertias and stiffnesses. Since the stiffnesses of the part of the curve near the origin are very small, whereas practical considerations require an appreciable stiffness to be maintained through to the free end of the system, one preferred form of approximation consists in cropping the end of the curve and arranging the free end at some point such as F. The number and spacing of the points at which the stiffness can conveniently be increased will then be decided, and in the present example are denoted by $L_1$ and $L_2$, the "fixed" end or node of the system being at N and the lengths $FL_1$, $L_1L_2$ and $L_2N$ being made equal. The stiffness of the first section $FL_1$ principally determines the deflection which will occur in the system under working loads and will be determined from the known requirements. In the diagram it is represented by $S_1$. The stiffnesses $S_2$ and $S_3$ of the sections $L_1L_2$ and $L_2N$ are chosen with a view to approximating to the curve Q, the areas enclosed above and below the curve being approximately equal. In this example the stiffnesses are in the ratio 1:5.3:28. In the case of a rotary shaft transmission, gearboxes will be inserted at the points $L_1$ and $L_2$ the transmission ratios of which are given respectively by $$\sqrt{\frac{S_2}{S_1}} \text{ and } \sqrt{\frac{S_3}{S_2}}$$

and in this particular case are both 2.3 to 1.

Figure 2 of the drawings is a family of curves for a transmission comprising three sections of equal length and showing the effect of varying the ratios of stiffness of the sections. In this diagram values of the stiffness ratio $$\frac{S_1}{S_3}$$

are indicated along the horizontal axis and of the ratio of the frequency of the composite transmission to that of a uniform transmission of the same total length are indicated along the vertical axis, while each of the several curves corresponds to a particular value of the stiffness ratio $$\frac{S_2}{S_3}$$

Results for other values of $$\frac{S_2}{S_3}$$

can be estimated by interpolation.

Taking the relative values of $S_1$, and $S_2$ and $S_3$ shown in Figure 1, the ratio $$\frac{S_1}{S_3} = \frac{1}{28} = 0.036$$

is represented by the vertical line A in Figure 2, while the ratio $$\frac{S_2}{S_3} = \frac{5.3}{28} = 0.19$$

is represented by the interpolated curve B. The horizontal line C through the intersection of lines A and B shows from the frequency ratio scale that the frequency will be 1.9 times that of a transmission of uniform stiffness and inertia. By choosing respectively smaller and greater stiffnesses for the sections $S_1$ and $S_3$ the frequency ratio may be raised a little, but for reasons already stated this may not be practicable.

A further increase is possible by dividing the transmission into a greater number of sections, but the theoretical limit is a frequency ratio of 2.86, and in practice it is difficult to improve upon 2.5.

The foregoing discussion is intended only to indicate the general approach to the problem of design and would in practice be supplemented by rigorous analytical examination of the effect of the numerous variables with a view to obtaining characteristics most suitable for the particular application.

Figure 3 shows one elastic remote control system in accordance with the invention in which the input member is hand-lever 10, which is manually restrained in use so that a node is produced at that end of the system. The output member is an aerofoil control surface 11 of an aircraft, which is substantially free so as to be capable of vibrational movements relative to the node at the hand-lever 10.

Adjusting movements of the hand-lever 10 are transmitted to the control surface 11 by means of tension-compression rods 12 interposed therebetween. Between each pair of adjacent rods 12 there is provided a lever 13 which has a fulcrum 14 in fixed structure 15 and is pivotally connected to the adjacent ends of the pair of rods 12. The pivotal connection between each lever 13 and the rod 12 of the pair which is nearer to the hand-lever 10 i. e. to the node of the system, is further from the fulcrum 14 than is the pivotal connection 17 with the other rod of the pair.

In this way the stiffness of the system (as defined above) is increased step by step at each lever 13 from the control surface 11, because the strain produced in the rods by unit load applied at either end of the system will be greatest in the rod 12 connected to the control surface 11 and least in the rod 12 connected to the hand-lever 10.

Figure 4 shows another embodiment of the invention in which torque is transmitted from a hand-lever 20, which is manually restrained during operation, through shafts 22, each made of the same material and of the same diameter, to a control surface 21. Hand-lever 20 constitutes the input member of the system and the control surface 21, which is free so as to be capable of vibrational movements relative to the hand-lever 20 constitutes the output member of the system.

Torque is transmitted from the hand-lever 20 to the first of the rods 22 through a sector gear 23, connected to move with the hand-lever 20, and a bevel gear 24 mounted on the rod. In this way the stiffness of the transmission as a whole is increased as compared with a transmission in which the hand-lever 20 is mounted direct on the shaft 22.

Between each adjacent pair of shafts 22 there is a gear train consisting of a small diameter pinion 25 mounted on the shaft of the pair nearer the hand-lever 20 and a large diameter pinion 26 mounted on the shaft of the pair further from the hand-lever 20. These gear trains have the effect of increasing the stiffness of the transmission step by step at each gear train from the output end of the transmission.

At the output end, the last shaft 22 is connected through eccentric gears 27, 28, a lever 29, tie-rod 30 and a lever 31 to the control surface 21. The eccentric gears 27, 28 have a transmission ratio which varies continuously through the whole or part of the working range, so that a fine control of the control surface 21 is available at a certain part or parts of the range of movement of the hand-lever 20 and a coarser control is available at another part or parts of the range.

Figure 5 shows a construction of the invention applied to a hydraulic elastic remote control transmission. In this construction the input member is constituted by a hand-lever 40 and the output member is again constituted by a control surface 41. The hand-lever 40 is connected by means of a rod 46, to an input piston 42 mounted in an input cylinder 43, and the control surface is connected by means of a lever 44 and rod 45 to an output piston 47 mounted in an output cylinder 48.

The input cylinder 43 and output cylinder 48 are connected by ducts 49 which have piston-and-cylinder connections, indicated generally by reference numeral 50, between each adjacent pair of ducts 49.

In use the hand-lever 40 is manually restrained so that it provides a node for the system. Each piston-and-cylinder connection comprises a large diameter cylinder 51 connected to the duct of its pair which is nearer the input cylinder 43 and containing a large diameter piston 52. The large diameter piston 52 is connected by a rod 53 with a small diameter piston 54 contained in a small diameter cylinder 55 which is connected to the duct of the pair further from the input cylinder.

The ducts and cylinders of the transmission cylinder are charged with hydraulic liquid and the provision of the piston and cylinder connections 50 results in reduced velocity of flow in each successive duct 49 from the input cylinder 43. In this way the stiffness of the system is increased step by step from the output end to the input end.

Figure 6 shows an embodiment of the invention used for transmitting motion from a single hand-lever 60 to a pair of control surfaces 61. The transmission is similar to that shown in Figure 4 in that it employs rotating shafts each adjacent pair of which has a speed reducing gear interconnecting them.

The hand-lever 60, which is manually restrained to provide a node in the system, is mounted on a shaft 62 and at the other end this shaft carries a small diameter pinion 63 which meshes with the large diameter pinion 64 carried on the next shaft 62.

At the other end of this next shaft 62 there is a small diameter bevelled gear 65 which meshes with a large diameter crown gear 66 mounted at the centre of a shaft 67. At either end of the shaft 67 there is a small diameter pinion 68 which meshes with the large diameter pinions 69 mounted on the adjacent ends of the shaft 70. Small diameter pinions 71 mounted on the other ends of the shafts 70 mesh with large diameter pinions 72 mounted on shafts 73 which are connected to the control surfaces through lever arms 74, by rods 75 and levers 76.

The provision of the speed reducing gears between each adjacent pair of shafts in the transmission results in the stiffness of the transmission being increased step by step from the output end to the input end. So far as the main system from the hand-lever 60 to the control surfaces 61 is concerned, the stiffness and inertia distribution is calculated in the way described above on the basis that the stiffnesses and inertias of the branch systems are taken together as the sum of their separate values. However, further problems arise in that the two branch systems, from the crown wheel 66 to each control surface 61 together form a secondary vibration system having a node at its junction with the main transmission i. e. at the crown wheel 66. The natural frequency of this system will therefore also have to be investigated and it may be that a compromise will have to be adopted in the distribution of the stiffnesses and inertias. In practical cases however it is usually found that the natural frequency of the secondary system is so much higher than that of the primary system that no change in the distribution of the stiffnesses is necessary.

Figure 7 shows another construction in accordance with the invention which is in some respects similar to that shown in Figure 4 and comprises an input hand-lever 80 which drives a train of shafts 81, 82, 83 through a quadrant gear 84 and a bevel gear 85. The output member is constituted by the control surface 79.

In this system however the shaft 81 is restrained against vibrational movement by a device 88 which may be, for example, an inertia damper of the kind shown or a one-way driving device of known kind, so that a node occurs at this point, both the hand lever 80 and control surface 79 being free to vibrate. In such a system serious vibration is unlikely to occur in the transmission from the hand lever 80 to the device 88 since power is not fed into the system from the hand lever while the latter is free to vibrate. This part of the transmission can therefore be constituted by a simple shaft 81. From the output member 79 to the device 88 however the stiffness of the transmission is increased step-by-step in accordance with the invention by means of gear trains 86, 87 as in Figure 4.

It has been assumed in the foregoing that the inertias of the gears or their equivalent are small in comparison with those of the transmission members. If however they should be appreciable it will be necessary to take account of their effect in the detailed analysis and adjust the stiffness of the transmission members accordingly.

We claim:

1. An elastic remote control system for transmitting movement from an input member to an output member and having an end which is substantially free so as to be subject to vibrational movements relatively to a node in the system, in which the stiffness of the transmission varies along the system from the free end to the node approximately in proportion to the fourth power of the distance from a point adjacent the free end of the system.

2. An elastic remote control system for transmitting movement from an input member to an output member, said system having an end which is substantially free so as to be subject to vibrational movements relatively to a node in the system, said system comprising at least three load-transmitting members which, in operation, are simply stressed and which have the same relation between density and stress/strain modulus for the transmission stresses and substantially uniform cross-section area, and in which the stiffness of the transmission is varied in steps from a minimum at the free end to a maximum at the node in proportion to the fourth power of the distance from a point somewhat beyond the free end of the system by the inclusion at spaced intervals along the system of means for changing the stress in the load-transmitting members as between one load-transmitting member and an adjacent load-transmitting member.

3. An elastic remote control system for transmitting movement from an input member to an output member, said system having an end which is substantially free so as to be subject to vibrational movements relatively to a node in the system and comprising at least three load-transmitting members which, in operation, are torsionally stressed and which have the same relation between density and stress/strain modulus for the transmission stresses and substantially uniform polar moments of inertia, and in which the stiffness of the transmission is varied in steps from a minimum at the free end to a maximum at the node in proportion to the fourth power of the distance from a point somewhat beyond the free end of the system by the inclusion at spaced intervals along the system of means for changing the stress in the load-transmitting members as between one load-transmitting member and an adjacent load-transmitting member.

4. An elastic remote control system according to claim 15, wherein the gearing is of the type in which the transmission ratio varies continuously through at least part of the working range.

5. A remote control system according to claim 2 wherein the load transmitting members are solid members of the same material and section and wherein the means for changing the stress is provided by means to produce a change of velocity of linear displacements between adjacent members.

6. A transmission system according to claim 5 wherein each means for producing a change of velocity comprises a lever having fixed fulcrum bearings and arms of different lengths to which the adjacent members are joined.

7. A transmission system according to claim 3 wherein the load-transmitting members are rotatable shafts and each means for changing the stress comprises toothed gearing effecting a change of rotational speed between adjacent shafts, so that the stiffness of the transmission is varied in steps from a minimum at the "free end" to a maximum at the node.

8. A hydraulic remote control system for transmitting movement from an input member to an output member and having an end which is substantially free so as to be subject to vibrational movements relatively to a node in the system wherein the load is transmitted by liquid pressure in at least three pipes of substantially uniform cross-sectional area, said system comprising at least two means for effecting a change in the velocity of the flow of the liquid between adjacent pipes which means are included at spaced intervals along the system so that the velocity of flow and therefore the stiffness of the system is varied in steps from a maximum at the node to a minimum at the free end of the system in proportion to the fourth power of the distance from a point somewhat beyond the free end of the system.

9. A hydraulic remote control system according to claim 8 wherein each means for effecting a change in the velocity of flow comprises inter-connected pistons of different area subjected to the pressures of the liquid in the adjacent pipes.

10. An elastic remote control system comprising an input member, an output member at one end of the system, which output member is substantially free so as to be capable of vibrational movements relative to a node in the system, at least three load transmitting sections between said input member and said output member and connecting means between adjacent load transmitting sections of a kind which decrease the stiffness of successive sections from said node in proportion to the fourth power of the distance from a point somewhat beyond the free end of the system.

11. An elastic remote control system comprising a fixed structure, an input member, an output member at one end of the system which output member is substantially free so as to be capable of vibrational movements relative to a node in said system, at least three tension-compression members connected between said input member and said output member, and at least two levers each having a fulcrum in said fixed structure and each having pivotal connections with adjacent ends of an adjacent pair of said tension-compression members, the pivotal connection between each lever and the tension-compression member between said lever and said node being further from the fulcrum of said lever than the pivotal connection between said lever and the other tension-compression member of said pair, said pivotal connections being located in relation to their fulcrums so that the stiffness of successive tension-compression members from said node decreases in proportion to the fourth power of the distance from a point somewhat beyond the free end of the system.

12. An elastic remote control system comprising an input member, an output member at one end of the system which output member is substantially free so as to be capable of vibrational movements relative to a node in said system, at least three shafts each made of the same material of the same cross-section arranged to transmit torque from said input member to said output member, and at least two speed-reducing gears each between a different pair of adjacent shafts arranged so that the shaft nearer the node of each such adjacent pair rotates faster than the shaft further from the node when the input member is adjusted, said speed-reducing gears having a speed reducing ratio such that the stiffness of successive shafts from said node decreases in proportion to the fourth power of the distance from a point somewhat beyond the free end of the system.

13. A hydraulic remote control system comprising an input member, an input cylinder, an input piston in said input cylinder and connected to said input member, an output member at one end of the system which output member is substantially free so as to be capable of vibrational movement relative to a node in said system, an output cylinder, an output piston in said output cylinder and connected to said output member, at least three ducts each having the same diameter as the others between said input cylinder and said output cylinder, a piston-andcylinder connection between each adjacent pair of ducts, each piston-and-cylinder connection comprising a large diameter cylinder connected to the duct between the connection and the node, a large diameter piston in said large diameter cylinder, a small diameter piston connected to said large diameter piston to move therewith, and a small diameter cylinder containing said small diameter piston and connected to the other duct of the pair, and hydraulic liquid charging said ducts and cylinders, the cylinders and pistons of each of said piston-cylinder connections being so dimensioned relatively to one another that the stiffness of the system is varied in steps from a maximum at the node to a minimum at the free end of the system in proportion to the fourth power of the distance from a point somewhat beyond the free end of the system.

14. An elastic remote control system according to claim 1 wherein the stiffness of the transmission as a whole is increased by providing in the system between the input member and the rest of the system stress decreasing means such as speed increasing gearing.

15. An elastic remote control system according to claim 1 comprising, between the output member and the rest of the system gearing of a transmission ratio necessary to obtain a control movement of the desired magnitude.

16. An elastic remote control system according to claim 14 wherein the gearing is of the type in which the transmission ratio varies continuously through at least part of the working range.

17. An elastic remote control system for transmitting movement from an input member to an output member and having an end substantially free so as to be subject to vibrational movements relatively to a node in the system comprising three adjacent load-transmitting members between the input and output members, and means for varying the stiffness of the transmission along the system from the free end to the node comprising two stress changing units one of which is disposed between each adjacent pair of load-transmitting members for changing the stress in the load-transmitting members as between one load-transmitting member and an adjacent load-transmitting member.

References Cited in the file of this patent
UNITED STATES PATENTS

| | | |
|---|---|---|
| 2,026,459 | Caretta | Dec. 31, 1935 |
| 2,036,619 | Brown et al. | Apr. 7, 1936 |
| 2,113,000 | Rowe | Apr. 5, 1938 |
| 2,205,610 | Van Nes | June 25, 1940 |
| 2,267,171 | Rubissow | Dec. 23, 1941 |
| 2,276,702 | Riparbelli | Mar. 17, 1942 |
| 2,612,058 | Waite | Sept. 30, 1952 |

FOREIGN PATENTS

| | | |
|---|---|---|
| 650,912 | France | Mar. 16, 1928 |
| 846,049 | France | May 27, 1939 |
| 1,003,822 | France | Nov. 21, 1951 |